UNITED STATES PATENT OFFICE.

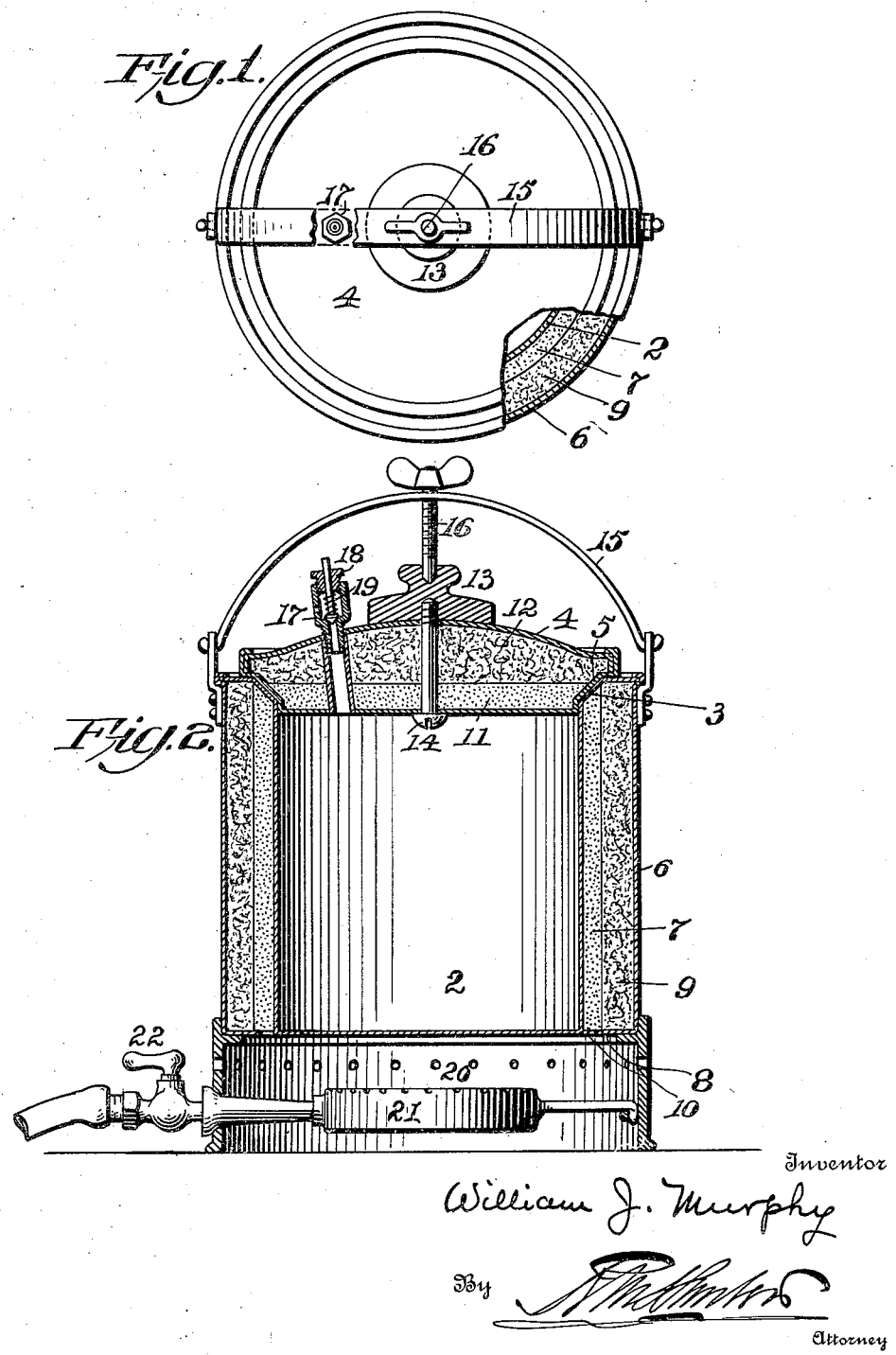

WILLIAM J. MURPHY, OF PHILADELPHIA, PENNSYLVANIA.

COOKING UTENSIL.

1,423,961.  Specification of Letters Patent.  Patented July 25, 1922.

Application filed October 14, 1918. Serial No. 258,003.

*To all whom it may concern:*

Be it known that I, WILLIAM J. MURPHY, a citizen of the United States, and resident of Philadelphia, county of Philadelphia, and State of Pennsylvania, have invented an Improvement in Cooking Utensils, of which the following is a specification.

The object of my invention is to provide a cooking utensil adapted to thoroughly cook foods of various kinds with a minimum consumption of fuel. My object is further to so treat the food that the cooking is accomplished in a gradual manner and under a pressure greater than that of the atmosphere.

In a more specific consideration of the nature of my invention, I have for an object the provision of a substantially airtight food container adapted to be directly placed upon a gas stove, range or other auxiliary burner and in which the walls of the container will quickly absorb sufficient heat units that the said utensil with its content may then be removed from the source of heat and allowed to stand for a sufficient length of time to enable the heat to transfer from the wall material inwardly to the substances to be cooked and in that manner insure final cooking thereof to the desired degree.

Aside from the effective cooking of the food substances, there is great economy in the utilization of a pot or vessel of the character herein described in that there is a very material conservation of heat units by reason of the fact that for only a relatively short time is the source of heat applied to the vessel to insure the ultimate complete cooking required. Where such an article is employed in connection with a gas stove, it is manifest that there is great economy where the heat may be applied in the course of two or three minutes and the gas flame then extinguished, leaving the cooking to continue for a period of a half hour or more without direct application of heat from the source.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Referring to the drawings: Fig. 1 is a plan view of my improved cooking vessel with portions broken away to show interior constructions; and Fig. 2 is a vertical section of the same.

2 is the container or pot which may be of cast metal or formed of sheet metal or otherwise as preferred. It is closed at the bottom and open at the top and said pot is provided with a conical seat 3 which receives a cover 4 to make an air-tight closure. An outer casing 6 surrounds the pot and may be secured to the upper part of its body as indicated, and may also have its lower edge inwardly flanged as at 8 so as to support the refractory jacket 7 and non-conducting material 9 which are interposed in the space between the side walls of the pot and casing.

The jacket 7 fits snugly to the outside of the pot 2 and corresponds in shape thereto, and while its lower edge 10 may be exposed to the source of heat, said jacket may be supported by resting upon the inner edge of the flange 8. I, however, do not restrict myself in this respect as to this cylindrical jacket 7. In the annular space between the refractory jacket 7 and the outer casing 6 is packed a non-conductor of heat, so that when the refractory jacket 7 becomes heated, its heat will not be conducted outwardly and lost, but will be directly conducted through the walls of the pot or vessel to the fluids or materials within the same, which are required to be cooked. The refractory jacket 7 may be molded from a mixture of silicate and cement to provide a relatively hard material, but at the same time one capable of absorbing a large amount of heat and thereafter radiating the same or supplying it directly by conduction to the walls and materials in contact therewith. This refractory jacket may be formed, if desired, of sand and magnesite cemented with chloride of magnesia. It may also be composed of molded soapstone or other heating material of a refractory nature, and I, therefore, do not limit myself in this respect.

The non-conducting packing 9 which surrounds the refractory jacket may be composed of asbestos, mineral wool, cell structure paper or any good satisfactory non-conductor which would be adapted to be packed in the space provided.

4 is a cover or closure for the top of the pot and is provided with a conical wall 5 which fits tightly to the conical wall 3 of the pot and makes a practically air-tight joint. The interior of this cover 4 is preferably provided with a refractory disc 11 adjacent to the bottom, said disc being of similar material as that composing the jacket 7 before described. Between the refractory layer and the upper part of the cover, the space is filled with the non-conducting material 12 which may be of the same character as the non-conducting filling 9 before described. If desired, the refractory disc or layer 11 may be omitted.

13 is a handle knob for the top of the cover and is held in place by means of a screw 14 passing through the cover. The upper end of this handle knob 13 is provided with a socket or recess in which the clamping screw 16 is centered. 15 is a bail which is hinged to the vessel and carries therein the threaded clamping screw 16 which, when positioned upon the knob 13, may be employed to apply pressure to clamp the lid tightly upon the pot so as to effectually seal the latter during the cooking operation. The cover 4 is provided with a pressure relief valve 17 which communicates on its outer end with the atmosphere and on the inner end with the interior of the pot 2. The valve is held to its seat end by the pressure of a spring 19 and the tension of the spring may be adjusted by the adjusting nut 18. By this means the degree of pressure desired within the vessel or pot during the cooking operation may be insured. Furthermore, by a construction of this character, the aroma of the materials being cooked are retained within the pot except in so far as an abnormal pressure may arise therein and may be relieved by the relief valve 17.

When the pot above described is in use, it may be placed directly over a gas stove or upon a coal range, but where neither of these sources of heat are available for heating the heat-absorbing refractory jacket 7, a similar form of gas heater, such as illustrated, may be considered as part of the utensil. This heating means comprises an annular stand or base 20 having apertures near its upper part and shaped to support and sustain the pot as shown. Near its lower part the base is provided with a gas burner 21 which may have the supply of gas controlled by a valve 22. This burner may be of any ordinary construction such as employed in gas stoves; in fact, any source of heat having sufficient intensity may be employed in connection with the supporting base 20 for the pot.

In use, the apparatus is operated as follows: The screw 16 is turned back, the bail 15 thrown to one side and the lid removed; the materials to be cooked are then placed in the pot, the lid replaced, the bail lifted and the screw 16 tightened to clamp the lid in position. The tension of the valve 17 is such as to give the desired resistance against the escape of the vaporous products from the materials being cooked, as will insure the desired aroma of the material remaining during the cooking whereby it is accomplished under a pressure greater than the atmosphere and moreover insures a temperature existing within the pot which is greater than 212°, the normal temperature of boiling water under atmospheric pressure. The pot when so charged, is placed upon the gas stove or range and is subjected to a considerable temperature so that the heat is absorbed, not only in the substances to be cooked, but also in the refractory jacket 7 as well as to some extent in the non-conducting wall 9. As soon as this heated condition has arrived (which may be accomplished in one or several minutes) the pot is removed and set aside for a further self cooking operation. The heat absorbed in the refractory materials 7 and 11 cannot be dissipated through the non-conducting bodies 9 and 12, and consequently is transmitted inwardly to the interior of the pot and there utilized in the complete cooking of the materials contained therein. In practice, it is found that the toughest of substances may be thoroughly cooked to a digestible condition by the direct application of heat to the vessel for two or three minutes and permit the remaining cooking to take place wholly by pressures of heat units from the refractory bodies 7 and 11 inwardly to the materials to be treated.

Having now described my invention, what I claim as new and desire to secure by Letters Patent, is:—

1. In a cooking utensil, a portable pot having a metal bottom unobstructed so as to be directly heated, a surrounding jacket of fixed form composed of refractory material tightly fitting to the outside walls of the pot, and an enclosing outer metal casing having a non-conducting packing extended about the refractory jacket, the said casing secured to the pot and mechanically holding the refractory jacket against downward displacement, combined with a hollow lid making a tight closure to the pot and also provided with heat non-conducting materials, and separate means carried by the pot to positively clamp the lid tightly in place, whereby a steam pressure may slowly build up within the pot after the same has been quickly heated and removed from the fire.

2. The invention according to claim 1, further characterized by having the lid provided with an adjustable pressure relief valve arranged for regulating the maximum pressure under which the cooking takes place.

In testimony of which invention, I hereunto set my hand.

WM. J. MURPHY.